US012583021B1

(12) United States Patent
Winter et al.

(10) Patent No.: US 12,583,021 B1
(45) Date of Patent: Mar. 24, 2026

(54) EXERCISE MAT CLEANING APPARATUS, SYSTEM, AND METHOD FOR USE THEREOF

(71) Applicant: H&W Systems LLC, Lafayette, CA (US)

(72) Inventors: Claire Winter, Lafayette, CA (US); William Harris, Manasquan, NJ (US)

(73) Assignee: H&W Systems LLC, Lafayette, CA (US)

( * ) Notice: Subject to any disclaimer, the term of this patent is extended or adjusted under 35 U.S.C. 154(b) by 0 days.

(21) Appl. No.: 18/225,079

(22) Filed: Jul. 21, 2023

Related U.S. Application Data

(60) Provisional application No. 63/391,589, filed on Jul. 22, 2022.

(51) Int. Cl.
*B08B 11/00* (2006.01)
*B08B 3/02* (2006.01)
*B08B 7/00* (2006.01)
*B08B 7/04* (2006.01)
*B08B 13/00* (2006.01)

(52) U.S. Cl.
CPC .............. *B08B 11/00* (2013.01); *B08B 3/022* (2013.01); *B08B 7/0057* (2013.01); *B08B 7/04* (2013.01); *B08B 13/00* (2013.01)

(58) Field of Classification Search
CPC ....... B08B 11/00; B08B 3/022; B08B 7/0057; B08B 7/04; B08B 13/00; B08B 1/20
See application file for complete search history.

(56) References Cited

U.S. PATENT DOCUMENTS

| | | | | |
|---|---|---|---|---|
| 6,148,846 A * | 11/2000 | Schell | F04F 10/00 | 137/558 |
| 6,253,394 B1 * | 7/2001 | Goyette | A47K 1/02 | 4/626 |
| 2014/0020723 A1 * | 1/2014 | Murphy | B08B 1/20 | 134/104.2 |
| 2015/0107633 A1 * | 4/2015 | Hartwell | A61L 9/20 | 134/122 R |
| 2017/0036248 A1 * | 2/2017 | Gross | B08B 3/022 | |
| 2021/0237131 A1 * | 8/2021 | Subar | B08B 7/0057 | |

* cited by examiner

*Primary Examiner* — Douglas Lee
(74) *Attorney, Agent, or Firm* — Rutan & Tucker, LLP; Kyle M. St. James

(57) ABSTRACT

Disclosed herein are apparatuses, systems, and methods for cleaning an exercise mat. The system includes multiple roller pairs configured to transport that mat through cleaning, rising, drying and disinfection stations. Operations defined by logic include spraying cleaning and rinsing solutions onto both side of the mat, simultaneously. Subsequent operations include removing the rinsing solution from mat via air knives and disinfecting the mat via UV light. Sensors detect the presence of the mat at a number of locations within the apparatus and the logic activates and deactivates multiple subsystems based sensor signals. Adjustable spacing between rollers accounts for different mat thicknesses. Volume sensors detect the volume of a solutions within supply containers.

22 Claims, 7 Drawing Sheets

EXERCISE MAT CLEANING APPARATUS, SYSTEM, AND METHOD FOR USE THEREOF

CROSS-REFERENCE TO RELATED APPLICATIONS

This application claims priority to U.S. Provisional Patent Application No. 63/391,589 filed Jul. 22, 2022, the entire contents of which are incorporated by reference herein.

BACKGROUND

An exercise mat is commonly used to provide comfort to a person performing exercises on a floor. Mats are often provided to patrons at a gym or recreation center or brought in by patrons themselves. During use, a mat becomes dirty and may be contaminated by skin or body fluid contact with the mat. As such, use of a mat may become a health hazard to a user unless the mat is cleaned and/or disinfected between uses. Cleaning and/or disinfecting an exercise mat on both sides can be difficult and awkward. Further, as liquids are used for cleaning and disinfecting, the mat must be dried before subsequent use which may take a long time. As such, there is a need for a simple and efficient way to clean and/or disinfect exercise mats between uses.

Disclosed herein are systems and methods that address the foregoing.

SUMMARY

Briefly summarized, disclosed herein is an apparatus for cleaning an exercise mat. The apparatus, according to some embodiments, includes a number of roller pairs configured to facilitate transportation of the exercise mat through the apparatus from a top of the apparatus to a bottom of the apparatus, where each roller pair includes a first roller configured to frictionally engage a first side of the exercise mat so that rotation of the first roller displaces the exercise mat and a second roller configured to passively engage an opposite second side of the exercise mat so that the second roller rotates in response to displacement of the mat through the apparatus.

The apparatus further includes a first plurality of spray nozzles configured to apply a cleaning solution to the exercise mat as the exercise mat is transported through the apparatus, where the first plurality of spray nozzles includes a first subset of the first plurality of spray nozzles directed toward the first side and a second subset of the first plurality of spray nozzles directed toward the second side.

The apparatus further includes a second plurality of spray nozzles configured to apply a rinsing solution to the exercise mat as the exercise mat is transported through the apparatus, where the second plurality of spray nozzles includes a first subset of the second plurality of spray nozzles directed toward the first side and a second subset of the second plurality of spray nozzles directed toward the second side.

In accordance with an embodiment, a first pair of rollers are configured to receive the exercise mat from a user at the top of the apparatus and a second pair of rollers are configured to receive the exercise mat from the first pair of rollers, where the second pair of rollers positioned below the first pair of rollers, and further where the first and second pluralities of spray nozzles are positioned between the first and second pairs of rollers, and the second plurality of spray nozzles are positioned below the first plurality of spray nozzles.

In some embodiments, the apparatus further includes a first pressurized air plenum from which pressurized air exits (e.g., an air knife) configured to dry the first side and a second first pressurized air plenum (e.g., an air knife) configured to dry the second side. Additionally, in some embodiments, absorbent, non-driven rollers in place of the pressurized air plenums. The absorbent, non-driven rollers may include: (i) a hollow tubular structure disposed on a rod about which the rollers may rotate, and (ii) a soft, absorbent exterior comprised of fabric or foam.

In some embodiments, a third pair of rollers are configured to receive the exercise mat from the second pair of rollers, and the first and second air knives are positioned between the second and third pairs of rollers.

In some embodiments, the apparatus further includes a first ultraviolet (UV) light source configured to disinfect the first side and a second UV light source configured to disinfect the second side.

In some embodiments, a fourth pair of rollers are configured to (i) receive the exercise mat from the third pair of rollers and (ii) dispense the exercise from the apparatus, and the first and second UV light sources are positioned between the third and fourth pairs of rollers.

In some embodiments, rotation of the first rollers of the first, second, third, and fourth roller pairs are synchronized such that transportation rates of the exercise mat through the first, second, third, and fourth roller pairs are equal.

In some embodiments, the first rollers of the first, second, third, and fourth roller pairs are rotationally coupled to a single motor.

Also disclosed herein is a system for cleaning an exercise mat that according to some embodiments, includes a cleaning subsystem including (i) a cleaning solution contained within a cleaning solution reservoir; (ii) a plurality of cleaning spray nozzles configured to spray the cleaning solution onto both sides of the exercise mat; and (iii) a cleaning solution pump fluidly coupled between the cleaning solution reservoir and the plurality of cleaning spray nozzles, where the cleaning solution pump is configured to pump the cleaning solution from the cleaning solution reservoir to the cleaning spray nozzles.

The system further includes a rinsing subsystem that includes (i) a rinsing solution contained within a rinsing solution reservoir; (ii) a plurality of rinsing spray nozzles configured to spray the rinsing solution onto both sides of the exercise mat so as to remove the cleaning solution from the exercise mat; and (iii) a rinsing solution pump fluidly coupled between the rinsing solution reservoir and the plurality of rinsing spray nozzles, where the rinsing solution pump is configured to pump the rinsing solution from the rinsing solution reservoir to the rinsing spray nozzles.

The system further includes a drying subsystem that includes a pair of air knife nozzles configured to direct air toward both sides of the exercise mat and an air pump fluidly coupled with the pair of air knife nozzles, where the air pump is configured to generate an air jet from each air knife nozzle to blow rinsing solution away from both sides of the exercise mat.

The system further includes a disinfecting subsystem that includes a pair of UV light sources configured to project UV light onto both sides of the exercise mat to disinfect both sides of the exercise mat.

The system further includes a transporting subsystem that includes a plurality of roller pairs configured to sandwich the exercise mat between the two rollers of each roller pair and a drive motor operatively coupled with a drive roller of each roller pair, the drive motor configured to rotate each drive roller to transport the exercise mat through the cleaning, rinsing, drying, and disinfecting subsystems.

The system further includes a console coupled with the cleaning solution pump, the rinsing solution pump, the air pump, the UV light sources, and drive motor, where the console includes a number of processors and a non-transitory computer-readable medium having stored thereon logic that, when executed by the one or more processors, causes operations of the system that include (i) activating the drive motor to transport the exercise mat through the cleaning, rinsing, drying, and disinfecting subsystems; (ii) activating cleaning solution pump to apply the cleaning solution to the exercise mat; (iii) activating the rinsing solution pump to remove the cleaning solution from the exercise mat; (iv) activating the air pump to remove the rinsing solution from the exercise mat; and (v) activating the UV light sources to disinfect the exercise mat.

In some embodiments, the system further includes a first mat sensor coupled with the console, where the first mat sensor is configured to detect when the user has inserted the exercise mat into an entrance of the system, and where the operations further include (i) detecting the presence of the exercise mat within the entrance and (ii) activating the drive motor in response to detecting the presence of the exercise mat within the entrance.

In some embodiments, the system further includes a second mat sensor coupled with the console, where the second mat sensor is configured to detect the presence of the exercise mat adjacent the cleaning spray nozzles, and where the operations further include (i) detecting the presence of the exercise mat adjacent the cleaning spray nozzles and (ii) activating the cleaning solution pump in response to detecting the presence of the adjacent the cleaning spray nozzles.

In some embodiments, the system further includes a third mat sensor coupled with the console, where the third mat sensor is configured to detect the presence of the exercise mat adjacent the rinsing spray nozzles, and where the operations further include (i) detecting the presence of the exercise mat adjacent the rinsing spray nozzles and (ii) activating the rinsing solution pump in response to detecting the presence of the exercise mat adjacent the rinsing spray nozzles.

In some embodiments, the system further includes a fourth mat sensor coupled with the console, where the fourth mat sensor is configured to detect the presence of the exercise mat adjacent the air knife nozzles, and where the operations further include (i) detecting the presence of the exercise mat adjacent the air knife nozzles and (ii) activating the air pump in response to detecting the presence of the exercise mat adjacent the air knife nozzles.

In some embodiments, the system further includes a fifth mat sensor coupled with the console, where the fifth mat sensor is configured to detect the presence of the exercise mat adjacent the UV light sources, and where the operations further include (i) detecting the presence of the exercise mat adjacent the UV light sources and (ii) activating the UV light sources in response to detecting the presence of the exercise mat adjacent the UV light sources.

In some embodiments, the system further includes (i) a first volume sensor coupled with the console, where the first volume sensor is configured to determine a volume of the cleaning solution within a cleaning solution reservoir and (ii) a second volume sensor coupled with the console, where the second volume sensor is configured to determine a volume of the rinsing solution within a rinsing solution reservoir, and where the operations further include (i) obtaining a first determined volume from the first volume sensor; (ii) obtaining a second determined volume from the second volume sensor; (iii) comparing the first and second determined volumes with first and second volume limits, respectively, stored in the non-transitory computer-readable medium; and (iv) providing a notification when at least one of the first or second determined volumes is less than the first or second volume limits, respectively.

In some embodiments, the system further includes a third volume sensor coupled with the console, where the third volume sensor is configured to determine a volume of liquid waste collected within a liquid waste reservoir, and where the operations further include (i) obtaining a third determined volume from the third volume sensor. (ii) comparing the third determined volume with a third volume limit stored in the non-transitory computer-readable medium, and (iii) providing a notification when the third determined volume exceeds the third volume limit.

Also disclosed herein is a method for cleaning an exercise mat that, according to some embodiments, includes (i) receiving the exercise mat within a cleaning apparatus, (ii) applying a cleaning solution simultaneously to each of both sides of the exercise mat within the apparatus, (iii) rinsing the cleaning solution simultaneously from each of both sides of the exercise mat within the apparatus, and (iv) drying the exercise mat within the apparatus.

In some embodiments, the method further includes collecting liquid waste within a collection container within the apparatus.

In some embodiments, the method further includes disinfecting the exercise mat within the apparatus via UV light.

In some embodiments, receiving the exercise mat includes drawing the exercise mat into the apparatus via a transporting mechanism of the apparatus.

In some embodiments, the method further includes dispensing the exercise mat from the apparatus via the transporting mechanism.

These and other features of the concepts provided herein will become more apparent to those of skill in the art in view of the accompanying drawings and following description, which disclose particular embodiments of such concepts in greater detail.

BRIEF DESCRIPTION OF THE DRAWINGS

Embodiments of the disclosure are illustrated by way of example and not by way of limitation in the figures of the accompanying drawings, in which like references indicate similar elements and in which.

DETAILED DESCRIPTION

Figure 1B:
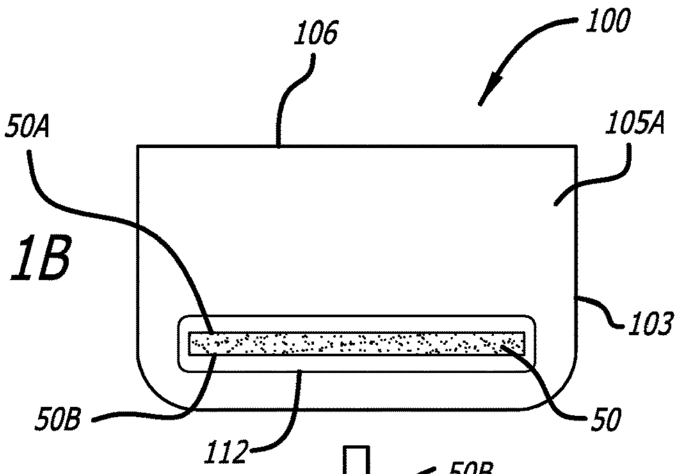
FIG. 1B illustrates a top view of the system of FIG. 1A, in accordance with some embodiments.

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "top," "bottom," "front," "back," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise.

The phrases "connected to," "coupled to," and "in communication with" refer to any form of interaction between two or more entities, including but not limited to mechanical, electrical, magnetic, electromagnetic, fluid, and thermal interaction. Two components may be coupled to each other even though they are not in direct contact with each other. For example, two components may be coupled to each other through an intermediate component.

The term "logic" may be representative of hardware, firmware or software that is configured to perform one or more functions. As hardware, the term logic may refer to or include circuitry having data processing and/or storage functionality. Examples of such circuitry may include, but are not limited or restricted to a hardware processor (e.g., microprocessor, one or more processor cores, a digital signal processor, a programmable gate array, a microcontroller, an application specific integrated circuit (ASIC), etc.), a semiconductor memory, or combinatorial elements.

Additionally, or in the alternative, the term logic may refer to or include software such as one or more processes, one or more instances, Application Programming Interface(s) (API), subroutine(s), function(s), applet(s), servlet(s), routine(s), source code, object code, shared library/dynamic link library (dll), or even one or more instructions. This software may be stored in any type of a suitable non-transitory storage medium, or transitory storage medium (e.g., electrical, optical, acoustical or other form of propagated signals such as carrier waves, infrared signals, or digital signals). Examples of a non-transitory storage medium may include, but are not limited or restricted to a programmable circuit; non-persistent storage such as volatile memory (e.g., any type of random-access memory "RAM"); or persistent storage such as non-volatile memory (e.g., read-only memory "ROM," power-backed RAM, flash memory, phase-change memory, etc.), a solid-state drive, hard disk drive, an optical disc drive, or a portable memory device. As firmware, the logic may be stored in persistent storage.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

References to approximations may be made throughout this specification, such as by use of the term "substantially." For each such reference, it is to be understood that, in some embodiments, the value, feature, or characteristic may be specified without approximation. For example, where qualifiers such as "about" and "substantially" are used, these terms include within their scope the qualified words in the absence of their qualifiers. For example, where the term "substantially straight" is recited with respect to a feature, it is understood that in further embodiments, the feature can have a precisely straight configuration.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

FIGS. 1A-1D illustrate front, top, bottom, and left right side views of an exercise mat cleaning system (system) 100, respectively, according to some embodiments. The system 100 includes an apparatus 103 that generally includes mechanical and electrical components of the system 100. The system 100 is generally configured to receive an exercise mat (mat) 50 at the top of the system 100 and dispense the mat 50 in a cleaned state from a bottom of the system 100. The mat 50 defines a back side 50A, a front side 50B, a width 51, and a thickness 52.

The system 100 includes a cover 105, defining a housing, coupled with a backing plate 106. The backing plate 106 defines a mounting surface for mounting the system 100 to a wall or a stand. The backing plate 106 may include mounting mechanism to facilitate mounting the backing plate 106 to the wall or the stand (see FIG. 6). The cover 105 is removably coupled to the backing plate 106 such that a user may remove or partially remove the cover 105 to gain access to components with the system 100.

The cover 105 includes an entry slot 112 extending through a top wall 105A of the cover 105. The entry slot 112 defines an opening for receiving the mat 50 therethrough. During use, the user may insert the mat 50 through the entry slot 112. The cover 105 includes a corresponding exit slot 114 extending through a bottom wall 105B of the cover 105. During use, the system 100 may dispense the mat 50 through the exit slot 114. In some embodiments, the cover 105 may include windows 116, 118 extending through a left side wall 105C of the cover 105. The windows 116, 118 may allow the user to visually assess the volume status of fluid containers within the system 100.

Figure 1D:
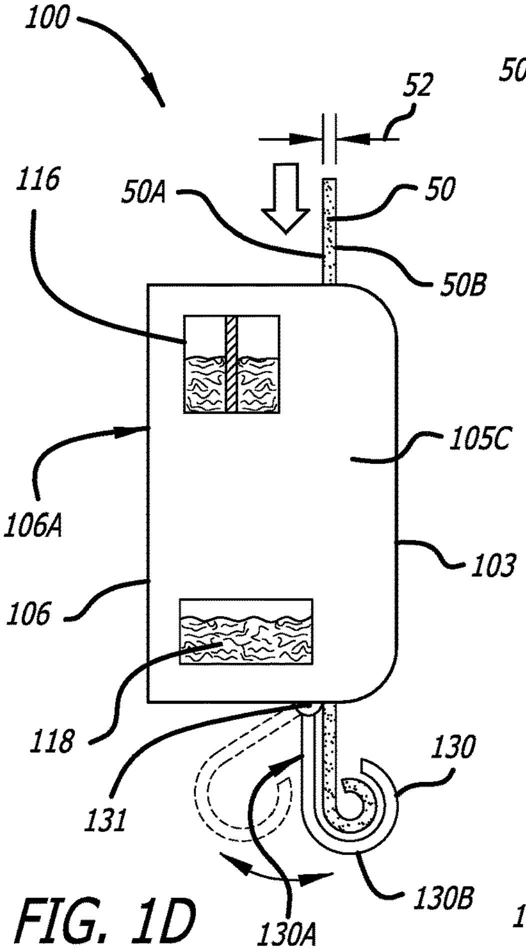
FIG. 1D illustrates a left side view of the system of FIG. 1A, in accordance with some embodiments.
Figure 1A:
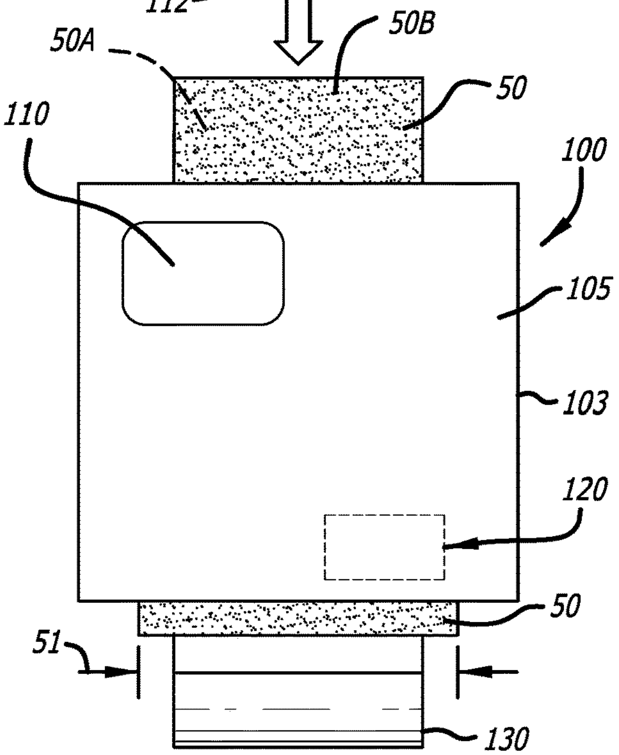
FIG. 1A illustrates a front view of a system for cleaning an exercise mat, in accordance with some embodiments.
Figure 1C:
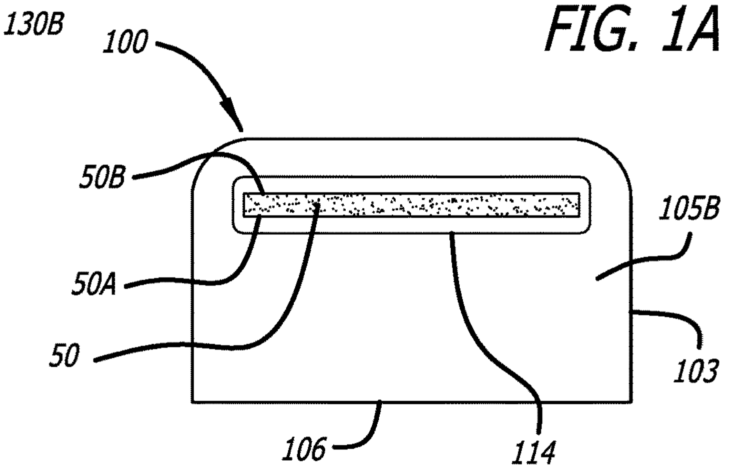
FIG. 1C illustrates a bottom view of the system of FIG. 1A, in accordance with some embodiments.

The system 100 may further include a mat rolling guide 130 extending downward from the bottom the apparatus 103 as shown in FIGS. 1A, 1D. The mat rolling guide 130 is generally configured to form the mat 50 into a rolled shape as the mat 50 is dispensed from the apparatus 103. The mat rolling guide 130 is pivotably coupled with the cover 105 via a hinge 131 so that the mat rolling guide 130 may pivot between an extended position as shown in FIG. 1D and a retracted position shown in phantom lines.

The mat rolling guide 130 may be formed of a sheet material, such as a plastic or metal sheet. The mat rolling guide 130 may include a straight portion 130 extending between a curled portion 130B and the hinge 131. The mat rolling guide 130 is positioned with respect to the exit slot 114 so that the mat 50 is dispensed along the straight portion 130A when the mat rolling guide 130 is disposed in the extended position. The curled portion 130B is configured to define the rolled shape of the mat 50 when the mat 50 is completely dispensed from the apparatus 103. In use, the user may pivot the mat rolling guide 130 to the retracted position to disable the rolling guide so that the mat 50 maintains a flat shape when the mat 50 is dispensed from the apparatus 103.

The system 100 includes a user interface (UI) 110 (e.g., a graphical user interface (GUI)) disposed on a front of the system 100. The UI 110 may receive input from the user and provide output to the user, such as status indicators, notifications, or alerts, for example. The UI is coupled with a console 120 of the system, where the console 120 is disposed within the housing. In some embodiments, the UI 110 may comprise physical buttons.

Figure 2A:
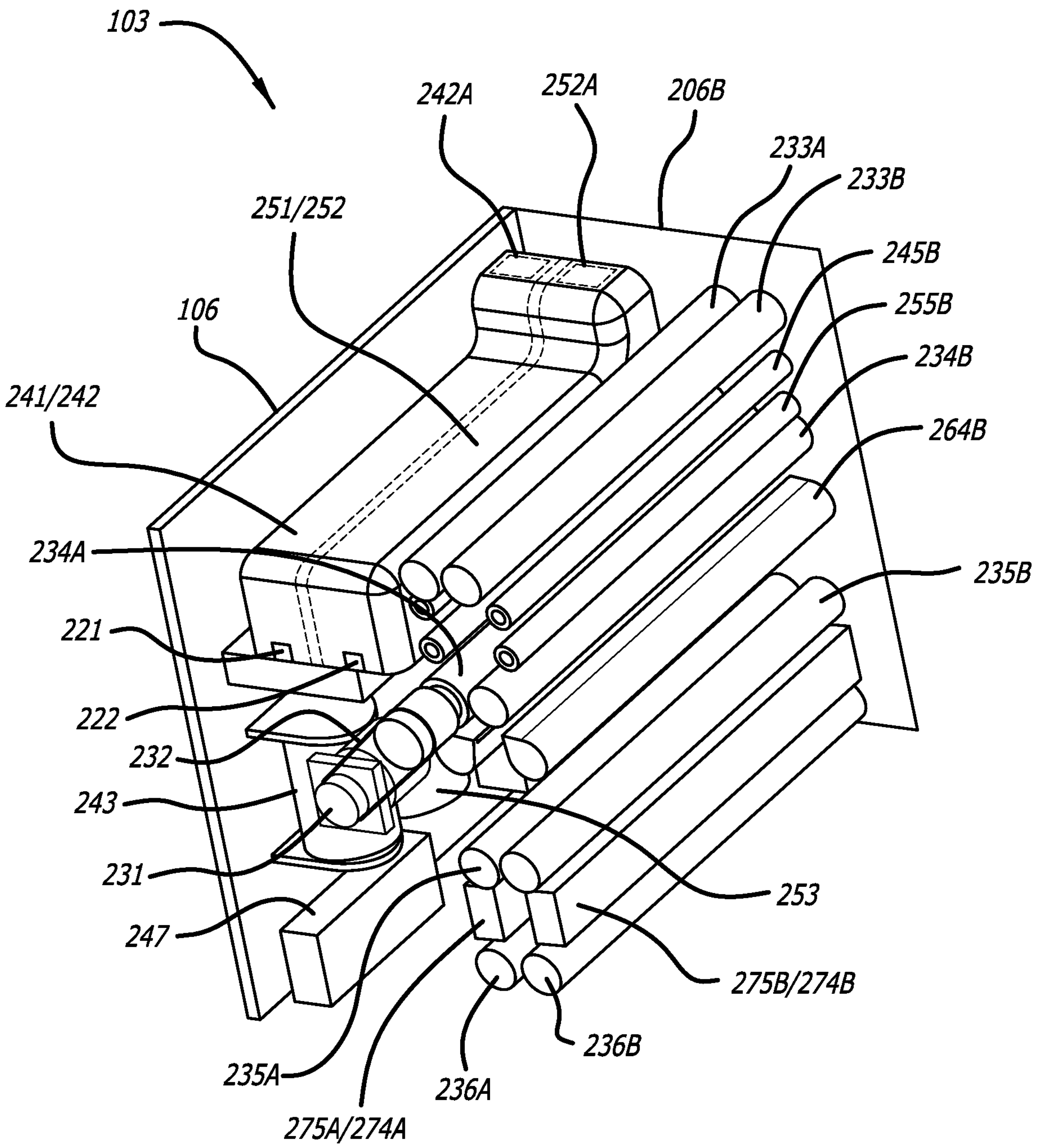
FIG. 2A is a left side perspective view of the system of FIG. 1A with the cover removed, in accordance with some embodiments.
Figure 2B:
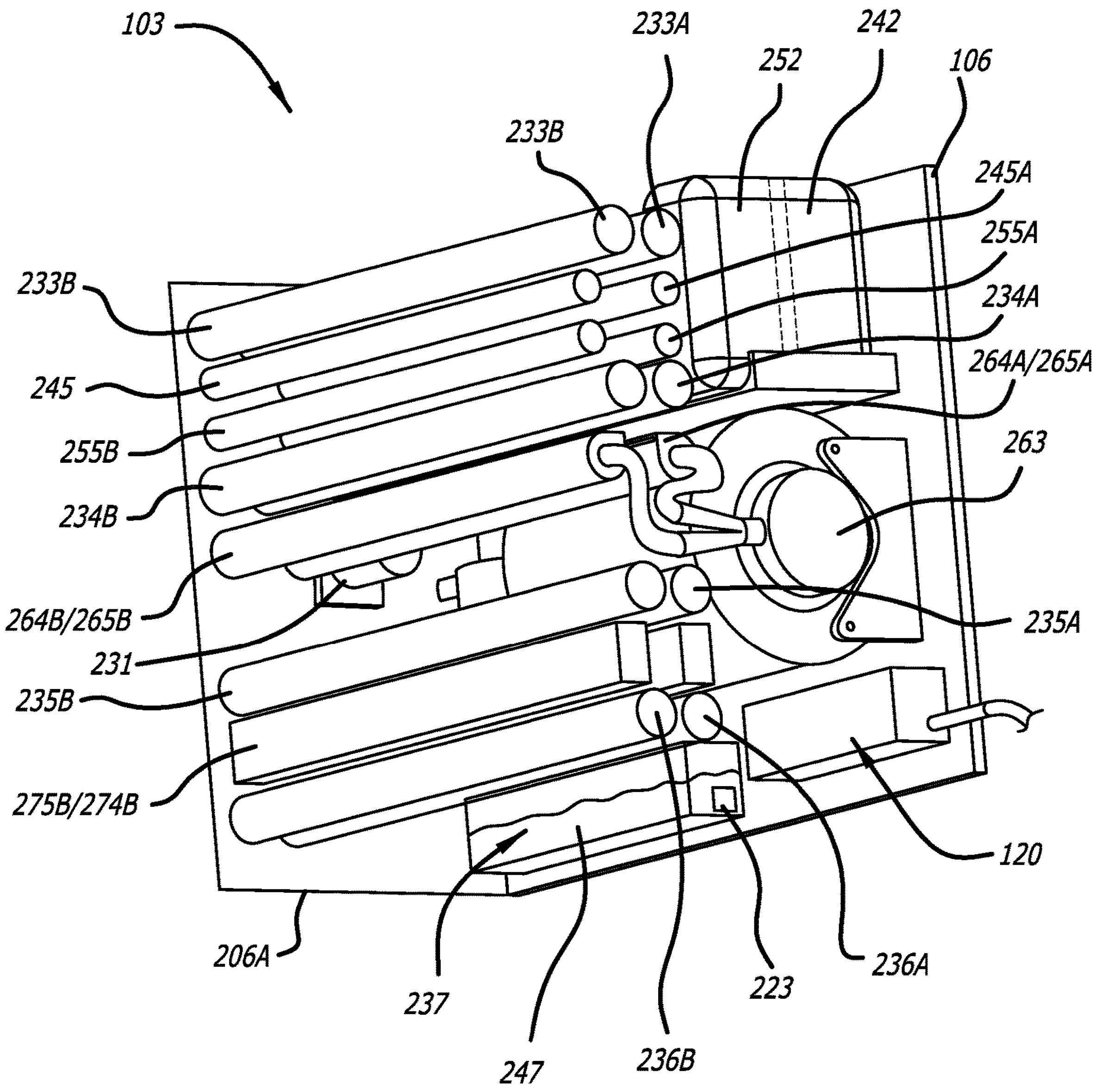
FIG. 2B is a right side perspective view of the system of FIG. 1A with the cover removed, in accordance with some embodiments.

FIG. 2A illustrates a left side perspective view of the system 100 with the cover 105 removed, i.e., detached from the backing plate 106. The backing plate 106 generally defines a frame of the system 100 for mounting components of the system 100. The backing plate 106 includes a left side plate 206A and a right side plate 206B that extend perpendicularly away from the back plate 106. The left side plate 206A is removed in FIG. 2A for illustration purposes. FIG. 2B illustrates a right side perspective view of the system 100 with the cover 105 removed and the right side plate 206B removed. The description that follows makes reference to both FIGS. 2A and 2B.

The system 100 generally includes a number of subsystems that define/perform the cleaning process of the mat 50. The system 100 includes a transporting subsystem for transporting the mat 50 along the cleaning process. The transporting subsystem includes a number of roller pairs, where each roller pair includes a drive roller and a passive (i.e., non-driven) roller. Each roller pair is configured to sandwich the mat 50 between the drive roller and a passive roller so that friction between the mat 50 and the drive roller defines a displacement (transportation) of the mat 50 according to a rotation of the drive roller. The transporting subsystem includes a drive motor 231 operatively coupled with each drive roller. In the illustrated embodiment, the transporting subsystem includes a plurality of roller pairs 233-236 (e.g., four), where each drive roller is designated with an "A" suffix and each passive roller is designated with a "B" suffix. In other embodiments, the transporting subsystem may include more or fewer than 4 roller pairs.

In the illustrated embodiment, the drive motor 231 is coupled with the drive roller 234A via a drive belt (e.g., a v-belt) 232. Each of the drive rollers 233A, 235A and 236A are coupled to the drive roller 234A via one or more additional drive belts (see FIG. 5) so that each of the drive rollers 233A-236A are operatively coupled with the drive motor 231. In the illustrated embodiment, the drive rollers 233A-236A define the same roller diameter and each of the drive rollers 233A-236A are coupled with the drive motor 231 so that the drive rollers 233A-236A rotate at the same angular velocity (RPM). In other embodiments, the drive rollers 233A-236A may have not all have the same roller diameter. Each of the drive rollers 233A-236A are positionally fixed to the each of the left and right side plates 206A, 206B. In some embodiments, the drive rollers 233A-236A may include a friction enhancing circumferential surface, such as a roughened surface, for example.

Each of the passive rollers 233B-236B is coupled with the left and right side plates 206A, 206B so as to be positionable with respect to the drive rollers 233A-236A, respectively. More specifically, each passive roller is positionable toward and away from the respective drive roller to accommodate different thicknesses 52 of the mat 50. Each of the passive rollers 233B-236B is biased toward its corresponding drive roller 233A-236A, respectively, so as to define a compressive force on the mat 50. In other words, each passive roller exerts a force on the mat 50 to define a normal force between the mat 50 and drive roller. Each passive roller 233B-236B may be coupled with the left and right side plates 206A, 206B via a biasing member (not shown) such as a compression spring disposed within a slot, for example. In some embodiments, the biasing member may be defined so as to define a substantially constant compressive force on mats of varying thicknesses 52.

The system 100 includes a cleaning subsystem generally configured to apply a cleaning solution to the mat 50. In the illustrated embodiment, the cleaning subsystem is configured to apply the cleaning solution to both sides of the mat 50 simultaneously. The cleaning subsystem generally includes a cleaning solution 241 disposed within a cleaning solution reservoir 242, a cleaning solution pump 243, a first set of cleaning solution spray nozzles 244A, and a second set of cleaning solution spray nozzles 244B (see FIG. 3). The cleaning solution pump 243 is fluidly coupled between the cleaning solution reservoir 242 and the first and second sets of cleaning solution spray nozzles 244A, 244B. The first and second sets of cleaning solution spray nozzles 244A, 244B are coupled with first and second manifolds 245A, 245B, respectively, so as to define a linear array of the first and second sets of cleaning solution spray nozzles 244A, 244B.

The cleaning solution reservoir 242 may include a cleaning volume sensor 221 configured to determine a volume of the cleaning solution 241 within the cleaning solution reservoir 242. The cleaning volume sensor 221 may be coupled with the console 120. The cleaning solution reservoir 242 may be formed of a translucent or transparent material so that the user may visually determine a volume of the cleaning solution 241 remaining within the cleaning solution reservoir 242. In some embodiments, the user may view the cleaning solution reservoir 242 through the window 116 of the cover 105. The cleaning solution reservoir 242 includes an openable cap 242A to enable filling of the cleaning solution reservoir 242 with the cleaning solution 241.

The system 100 includes a rinsing subsystem generally configured to apply a rinsing solution to the mat 50 so as to rinse away the cleaning solution from the mat 50. In the illustrated embodiment, the rinsing subsystem is configured to apply the rinsing solution to the front and back sides 50B, 50A of the mat 50, simultaneously. The rinsing subsystem generally includes a rinsing solution 251 disposed within a rinsing solution reservoir 252, a rinsing solution pump 253, a first set of rinsing solution spray nozzles 254A and a second set of rinsing solution spray nozzles 254B. The rinsing solution pump 253 is fluidly coupled between the rinsing solution reservoir 252 and the first and second sets of rinsing solution spray nozzles 254A, 254B (see FIG. 3). The first and second sets of rinsing solution spray nozzles 254A, 254B are coupled with first and second manifolds 255A, 255B, respectively, so as to define a linear array of the first and second sets of rinsing solution spray nozzles 254A, 254B.

The rinsing solution reservoir 252 may include a rinsing volume sensor 222 configured to determine a volume of the rinsing solution 251 within the rinsing solution reservoir 252. The rinsing volume sensor 222 may be coupled with the console 120. The rinsing solution reservoir 252 may be formed of a translucent or transparent material so that the user may visually determine a volume of the rinsing solution 251 remaining within the rinsing solution reservoir 252. In some embodiments, the user may view the cleaning solution reservoir 252 through the window 116 of the cover 105. The rinsing solution reservoir 252 includes an openable cap 252A to enable filling of the rinsing solution reservoir 252 with the cleaning solution 251.

In the illustrated embodiment, the cleaning solution reservoir 242 and rinsing solution reservoir 252 are fixed within the apparatus 103 so as to be refillable by opening the caps 242A, 252A, respectively. In other embodiments, the cleaning solution reservoir 242 and/or rinsing solution reservoir 252 may be replaceable. More specifically, each of the cleaning solution reservoir 242 and/or rinsing solution reservoir 252 may be configured to be replaced by the user as opposed to being refilled by the user. As such, the cleaning solution reservoir 242 and/or rinsing solution reservoir 252 may be configured to automatically establish fluid communication with their respective pumps upon placement of the reservoir within the apparatus 103.

The system 100 includes a drying subsystem generally configured to dry the mat 50 or otherwise remove the rising solution 252 and/or the cleaning solution 242 from the front and back sides 50B, 50A of the mat 50. The drying subsystem generally includes an air pump 263 fluidly coupled a first air knife nozzle 264A and a second air knife nozzle 264B such that air dispensed from the first air knife 265A and a second air knife nozzle 265B is configured to dry front and back sides 50B, 50A of the mat 50.

The system 100 may further include a disinfecting subsystem configured to disinfect the front and back sides 50B, 50A of the mat 50. The disinfecting subsystem generally includes a first UV light source 275A configured to project UV light onto the back side 50A of the mat 50 and a second UV light source 275B configured to project UV light onto the front side 50B of the mat 50, thereby disinfecting both the front and back sides 50B, 50A of the mat 50. Each of the first and second UV light sources 275A, 275B may be contained within first and second UV light source housings 274A, 274B, respectively. In some embodiments, the UV light sources UV light sources 275A, 275B may be configured to project a UV light in the far UV light wavelength range.

The system 100 further includes a waste container 247 configured to collect and contain liquid waste 237 which may generally include a combination of the cleaning solution 241 after application to and removal from the mat 50 and the rinsing solution 251 after application to and removal from the mat 50 as further described below with reference to FIG. 3. The waste container 247 may include a waste volume sensor 223 configured to determine a volume of liquid waste 237 within the waste container 247. The waste volume sensor 223 may be coupled with the console 120. The waste container 247 may be formed of a translucent or transparent material so that the user may visually determine a volume of the liquid waste 237 within the waste container 247. In some embodiments, the user may view the waste container 247 through the window 118 of the cover 105.

Figure 3:
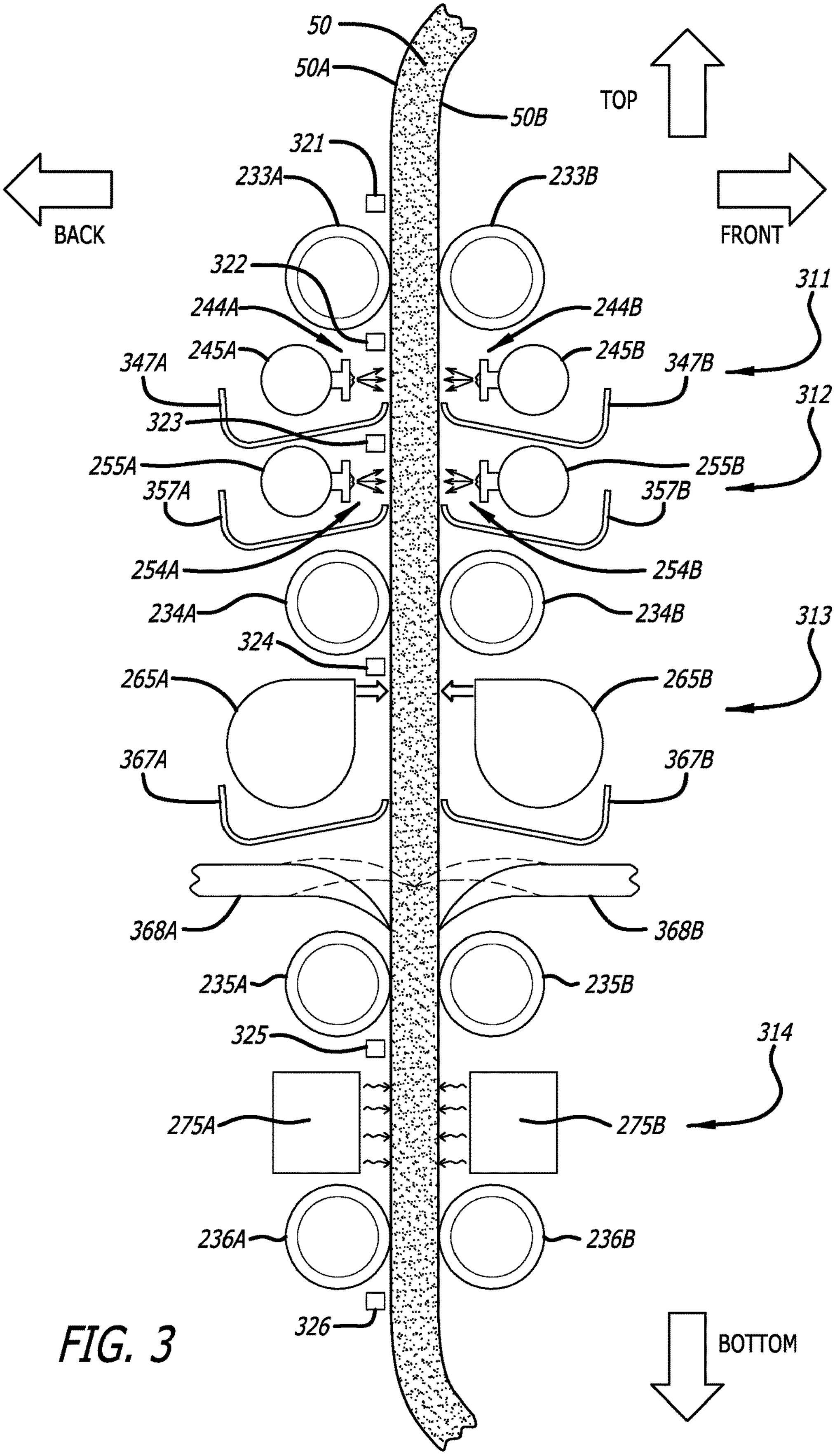
FIG. 3 illustrates is a cross-sectional left side view of operational components of the system of FIG. 1A during a cleaning process of an exercise mat, in accordance with some embodiment.

FIG. 3 illustrates a detailed side cross-sectional view of components of the system in combination with the mat 50, according to some embodiments. As shown, the mat 50 is transported vertically downward through the apparatus 103 to facilitate a continuous cleaning process of the mat 50 during transportation. In other embodiments, the mat 50 may be transported upward though the apparatus 103 or sideways through the apparatus 103.

The mat 50 is sandwiched between the "A" and "B" rollers of each roller pair, i.e., the roller pairs 233A-233B, 234A-234, B235A-235, B236A-236B sequentially as the mat 50 travels downward through the apparatus 103. The rollers 233A, 233B receive the mat 50 at the top of the apparatus 103 in response to the user inserting the mat 50 through the entry slot 112 in the cover (see FIG. 1B). The mat 50 passes sequentially through the cleaning process 311, the rinsing process 312, the drying process 313, and the disinfecting process 314.

The system 100 may include sensors along the process pathway to detect the presence and/or absence of the mat 50 at various location along the process pathway. The sensors may be used to activate and/or deactivate the cleaning process 311, the rinsing process 312, the drying process 313, and/or the disinfecting process 314 as the mat 50 passes through the respective processes. In the illustrated embodiment, the system 100 includes a mat entry sensor 321, a cleaning sensor 322, a rinsing sensor 323, a drying sensor 324, a disinfecting sensor 325, and a mat exit sensor 326. In some embodiments, the system 100 may include additional sensors and in other embodiments, one or more sensors may be omitted. Each of the sensors may utilize any suitable sensor technology to detect the presence/absence of the mat 50 adjacent the location of the sensor, such as proximity sensing, optical interrupt sensing, optical reflection sensing, for example. Each sensor is coupled with the console 120 so that logic of the console 120 may utilize an output of the sensor to affect operation of the system 100.

The mat entry sensor 321 is configured to detect the presence of the mat 50 immediately above (i.e., upstream) of the roller pair 233A, 233B, such as when the user inserts the mat 50 through the entry slot 112. By way of one example, the system 100 may be disposed in a standby mode until the mat 50 is inserted into the system 100 by the user. Upon detection of the mat 50 by the mat entry sensor 321, the system 100 may transition out of the standby mode.

The mat exit sensor 322 is configured to detect the presence of the mat 50 immediately below (i.e., downstream) of the roller pair 236A, 236B (i.e., the last roller pair). As such, the mat exit sensor 326 may detect the absence of the mat 50 when the mat 50 is completely dispensed from the apparatus 103. By way of one example, upon detection of the absence of mat 50 by the mat exit sensor 326, the system 100 may transition back toward the standby mode.

The cleaning sensor 322 detects the presence of the mat 50 within the cleaning process 311. The system may utilize the cleaning sensor 322 to activate and/or deactivate the cleaning process 311. As the cleaning solution 241 is applied (sprayed onto) to the mat 50 during the cleaning process 311, accurately controlling the operating duration of the cleaning process 311 may define efficient use of the cleaning solution 241. Utilization of the cleaning sensor 322 may facilitate efficient use of the cleaning solution 241.

Similarly, the rinsing sensor 323 detects the presence of the mat 50 within the rinsing process 312. The system may utilize the rinsing sensor 323 to activate and/or deactivate the rinsing process 312. As rinsing solution 251 is applied (sprayed onto) to the mat 50 during the rinsing process 312, accurately controlling the operating duration of the rinsing process 312 may define efficient use of the rinsing solution 251. Utilization of the rinsing sensor 323 may facilitate efficient use of the rinsing solution 251.

The drying sensor 324 detects the presence of the mat 50 within the drying process 313. The system 100 may utilize the drying sensor 324 to activate and/or deactivate the drying process 313. As drying process 313 uses the air pump 263 and as the air pump 163 may consume significant electrical power as well as generate a significant noise, it may be advantageous to minimize the operating duration of the drying process 313. Utilization of the drying sensor 323 may facilitate minimal operating duration of the air pump 263.

The disinfecting sensor 325 detects the presence of the mat 50 within the disinfecting process 314. The system 100 may utilize the disinfecting sensor 325 to activate and/or deactivate the disinfecting process 314, i.e., turn on and off the UV light sources 275A, 275B. In some embodiments, the UV light sources 275A, 275B consume significant electrical power, have a limited operating life, and/or degrade materials within the apparatus 103. As such, it may be advantageous to minimize the operating duration of the disinfecting process 314. Utilization of the disinfecting sensor 324 may facilitate minimal operating duration of the UV light sources 275A. 275B.

The collection of liquid waste 237 during use of the system 100 may be advantageous so that the liquid waste 237 does not leak/drip from the housing. As such, the system 100 may include a number of gutters configured collect the liquid waste 237 and transport the liquid 237 to the waste container 247. Each gutter may define a horizontally disposed longitudinally length that approximates or is greater than the width 51 of the mat 50. Each gutter defines a cross-sectional shape consistent with defining a liquid flow channel. A bottom wall of each gutter may angle/tilt downward away from the mat 50 to cause liquid to collect away from the mat 50 within the gutter. Each gutter is tilted downward from right to left so that liquid flows along the gutter toward the waste container 247 located adjacent the left side of the apparatus 103.

The system 100 may include cleaning gutters 347A, 347B positioned beneath the cleaning solution spray nozzles 244A, 244B, respectively, to collect any cleaning solution 241 that may drip from the cleaning solution spray nozzles 244A, 244B or any other components of the cleaning process 311.

Similarly, the system 100 may include rinsing gutters 357A, 357B positioned beneath the rinsing solution spray nozzles 254A, 254B, respectively, to collect any rinsing solution 251 and/or cleaning solution 241 that may drip from the rinsing solution spray nozzles 244A, 244B or any other components of the rinsing process 312.

The system 100 may include drying gutters 367A, 367B positioned beneath the air knives 265A, 265B, respectively, to collect the rinsing solution 251 and/or cleaning solution 241 that is blown off the mat 50 and prevent the rinsing solution 251 and/or cleaning solution 241 from reaching and wetting the UV light sources 275A, 275B.

In some embodiments, the system 100 may include a pair of flexible lip members 368A, 368B that are configured to further prevent rinsing solution 251 and/or cleaning solution 241 from dripping or otherwise migrating toward the UV light sources 275A. 275B or out of the apparatus 103. The flexible lip members 368A, 368B generally deflect to define an open slot for the mat 50 to pass through as the mat 50 is transported through the apparatus 103. In the absence of the mat 50, the flexible lip members 368A, 368B deflect toward each other to define a closed slot as shown in phantom lines. The flexible lip members 368A, 368B may be located between the air knives 265A, 265B and the UV light sources 275A, 275B. By way of summary, the flexible lip members 368A, 368B may define a fluid barrier between the air knives 265A. 265B and the UV light sources 275A, 275B when the mat 50 is not disposed within the apparatus 103, and the flexible lip members 368A, 368B deflect outward in response contact with the mat 50 to define an open slot for the mat 50 to pass through. In some embodiments, the flexible lip members 368A, 368B may slide along the mat 50 so as to wipe liquid from the mat 50 during transportation of the mat 50 between the flexible lip members 368A, 368B.

Figure 4:
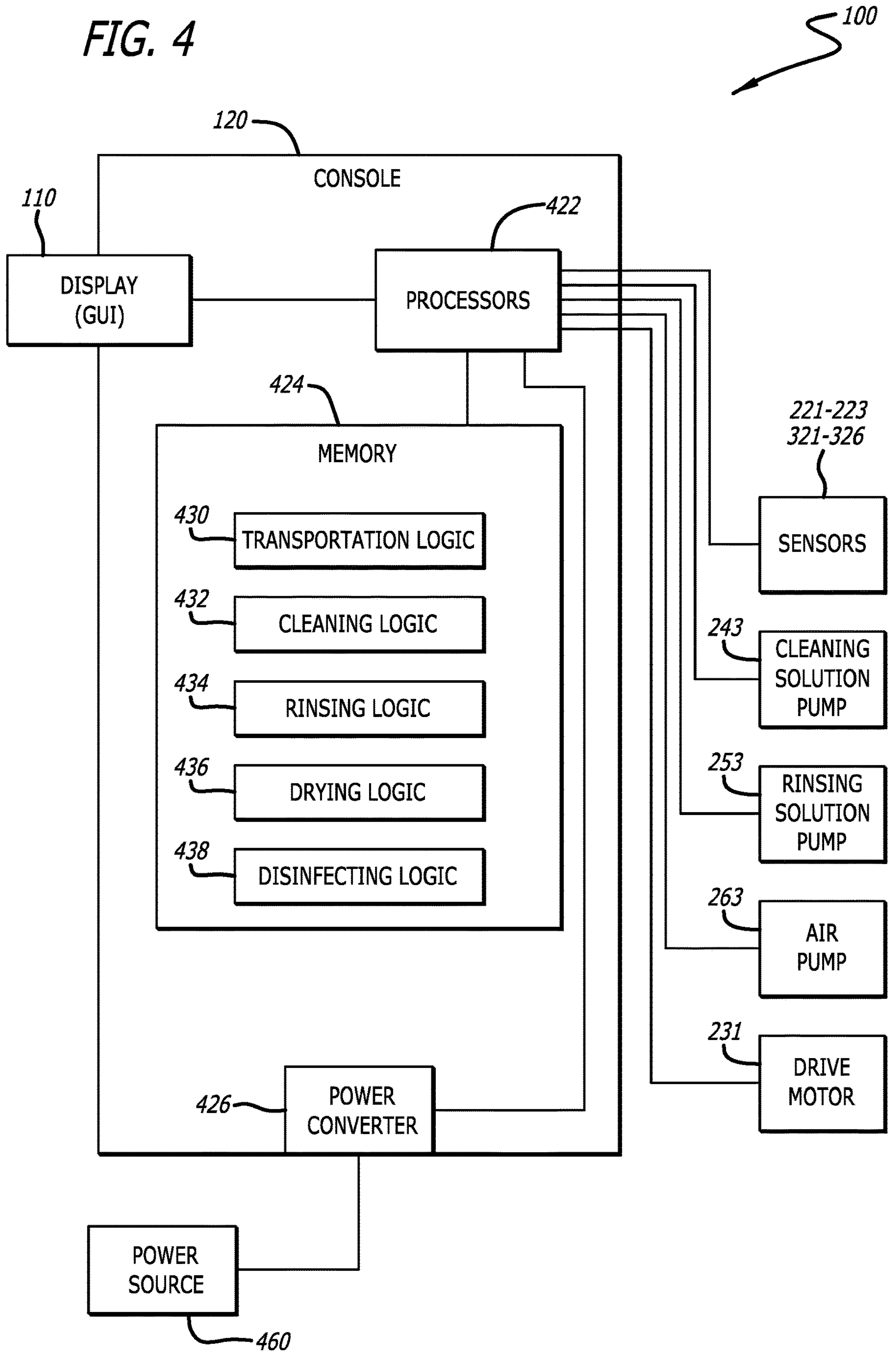
FIG. 4 illustrates a block diagram of a console of the system of FIG. 1A, in accordance with some embodiments.

FIG. 4 illustrates a block diagram of the console 120. The console 120 is operatively coupled with various components of the system 100. The console 120 receives power from a facility power source 460. A power converter 426 converts the facility power to operate the components of the console 120 and the other electrical components of system 100. The console 120 is couple with the UI 110. The console includes a number (e.g., 1, 2, 3 or more) of processors 422 coupled with memory 424 including a non-transitory computer readable medium. Logic stored in the memory may include transportation logic 430, cleaning logic 432, rising logic 434, drying logic 436, and disinfecting logic 438.

The logic defines the operations of the system 100 as forth described below. The transportation logic 430 generally defines the operation of the transportation subsystem including displacement of the mat 50 through the apparatus 103. The transportation logic 430 activates and deactivates the drive motor 231. The transportation logic 430 may define an RPM of the drive motor 231. In some embodiments, the drive motor 231 may be DC motor and the transportation logic 430 may define the DC voltage supplied to the drive motor 231 to define the RPM of the drive motor 231. The transportation logic 430 may define the direction of rotation of the drive motor 231 to transport the mat 50 down through the apparatus 103 during normal operation of the system 100. In some instances, the transportation logic 430 may reverse the direction of rotation so as to displace the mat 50 in the opposite direction, such as in the case of a jam. The transportation logic 430 may activate the drive motor 231 in response to a signal from the mat entry sensor 321. More specifically, the mat entry sensor 321 may detect that the user has inserted the mat 50 through the entry slot 112 (FIG. 1B) and in response, the transportation logic 430 may activate the drive motor 231 to begin transporting the mat 50 through the apparatus 103. In similar fashion, the mat exit sensor 326 may detect that the mat 50 is completed dispensed through/from the exit slot 114 (FIG. 1C) at the bottom of the apparatus 103, and in response, the transportation logic 430 may deactivate the drive motor 231.

The cleaning logic 432 generally defines the operation of the cleaning subsystem. The cleaning logic 432 activates and deactivates the cleaning solution pump 243 to initiate and discontinue spraying the cleaning solution 241 onto the mat 50. The cleaning logic 432 may activate and deactivate the cleaning solution pump 243 in response to a signal from the cleaning sensor 322. More specifically, the cleaning logic 432 may activate the cleaning solution pump 243 when the cleaning sensor 322 detects the presence of the mat 50 within the cleaning process 311, e.g., between the between the cleaning solution spray nozzles 244A, 244B. The cleaning logic 432 may also deactivate the cleaning solution pump 243 when the cleaning sensor 322 detects the absence of the mat 50 within the cleaning process 311. e.g., between the between the cleaning solution spray nozzles 244A, 244B.

The cleaning logic 432 may also monitor the level/volume of the cleaning solution 241 within the cleaning solution reservoir 242 and generate a response based on the level/volume. More specifically, the cleaning logic 432 may receive a signal from the cleaning volume sensor 221, where the signal indicates a present volume of cleaning solution 241 within the cleaning solution reservoir 242. The cleaning logic 432 may compare the present volume of cleaning solution 241 with a minimum volume limit of cleaning solution 241 stored in the memory 424, and as a result of the comparison, provide a notification via the UI 110 to the user when the present volume of cleaning solution 241 is less than the minimum volume limit of cleaning solution 241. The cleaning logic 432 may also continuously provide notification regarding the present volume of cleaning solution 241 with the cleaning solution reservoir 242.

The rinsing logic 434 generally defines the operation of the rinsing subsystem. The rinsing logic 434 activates and deactivates the rinsing solution pump 253 to initiate and discontinue spraying the rinsing solution 251 onto the mat 50. The rinsing logic 434 may activate and deactivate the rinsing solution pump 253 in response to a signal from the rinsing sensor 323. More specifically, the rinsing logic 434 may activate the rinsing solution pump 253 when the rinsing sensor 323 detects the presence of the mat 50 within the rinsing process 311, e.g., between the between the rinsing solution spray nozzles 254A, 254B. The rinsing logic 434 may also deactivate the rinsing solution pump 253 when the rinsing sensor 323 detects the absence of the mat 50 within the rinsing process 312, e.g., between the between the rinsing solution spray nozzles 254A, 254B.

The rinsing logic 434 may also monitor the level/volume of the rinsing solution 251 within the rinsing solution reservoir 252 and generate a response based on the level/volume. More specifically, the rinsing logic 434 may receive a signal from the rinsing volume sensor 222, where the signal indicates a present volume of rinsing solution 251 within the rinsing solution reservoir 252. The rinsing logic 434 may compare the present volume of rinsing solution 251 with a minimum volume limit of rinsing solution 251 stored in the memory 424, and a result of the comparison provide a notification to the user when the present volume of rinsing solution 251 is less than the minimum volume limit of rinsing solution 251 via the UI 110. The rinsing logic 434 may also continuously provide notification regarding the present volume of rinsing solution 251 within the rinsing solution reservoir 252.

The drying logic 436 generally defines the operation of the drying subsystem. The drying logic 436 activates and deactivates the air pump 263 to respectively initiate and discontinue removing/blowing the rinsing solution 251 from the mat 50. The drying logic 436 may activate and deactivate the air pump 263 in response to a signal from the drying sensor 324. More specifically, the drying logic 436 may activate the air pump 263 when the drying sensor 324 detects the presence of the mat 50 within the drying process 313, e.g., between the between the air knives 265A, 265B. The drying logic 434 may also deactivate the air pump 263 when the drying sensor 324 detects the absence of the mat 50 within the drying process 313, e.g., between the between the air knives 265A, 265B.

The disinfecting logic 438 generally defines the operation of the disinfecting subsystem. The disinfecting logic 438 activates and deactivates the UV light sources 275A, 275B to initiate and discontinue projecting UV light onto the mat 50. The disinfecting logic 438 may activate and deactivate the UV light sources 275A, 275B in response to a signal from the disinfecting sensor 325. More specifically, the disinfecting logic 438 may activate the UV light sources 275A, 275B when the disinfecting sensor 325 detects the presence of the mat 50 within the disinfecting process 314, e.g., between the between the UV light sources 275A, 275B. The disinfecting logic 438 may also deactivate the UV light sources 275A, 275B when the disinfecting sensor 325 detects the absence of the mat 50 within the disinfecting process 314, e.g., between the between the UV light sources 275A, 275B.

The logic, e.g., the cleaning logic 432 or rinsing logic 434, may monitor the level of waste liquid 237 within the waste container 247. More specifically, the logic may receive a signal from the waste volume sensor 223, where the signal indicates a present volume of liquid waste 237 within the waste container 247. The logic may compare the present volume of liquid waste 237 with a maximum volume limit of liquid waste 237 stored in the memory 424, and a result of the comparison provide a notification to the user when the present volume of liquid waste 237 exceeds the maximum volume limit of liquid waste 237 via the UI 110. The logic may also continuously provide notification regarding the present volume of liquid waste 237 within the waste container 247.

Figure 5:
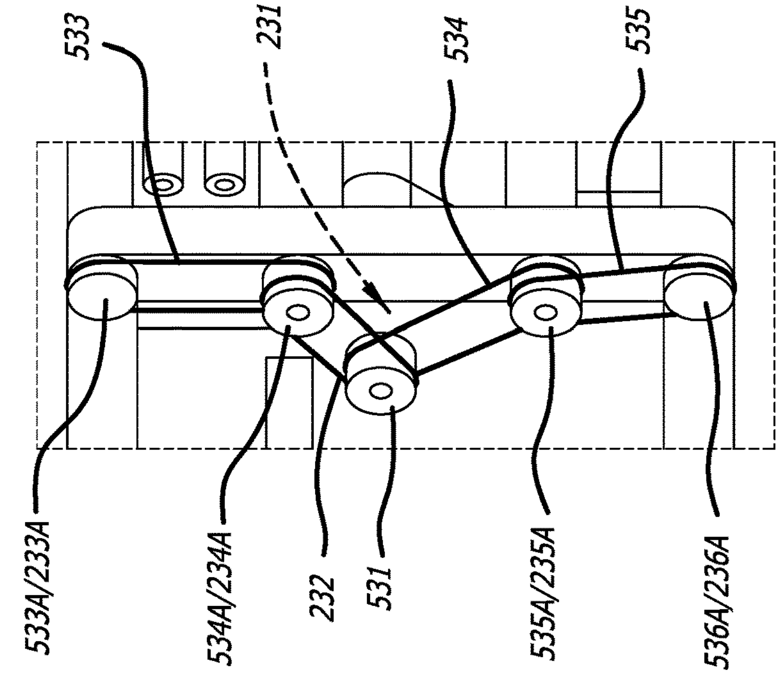
FIG. 5 is a detailed illustration of a roller drive mechanism of the system of FIG. 1A, in accordance with some embodiments.

FIG. 5 illustrates a detailed view of a roller drive mechanism. The roller drive mechanism general includes an arrangement of pulleys and belts that rotatably couple each of the drive rollers 233A-236A to the drive motor 231. Each of the drive rollers includes a pulley that is rotatably fixed to the drive roller so that the drive roller co-rotates with the pulley. The drive rollers 233A-236A include the pulleys 533A-536A, respectively. Similarly, the drive motor 231 includes a pulley 531.

The pulley 531 is rotatably coupled with each of the pulleys 533A-536A via the belts 232, 533-535. Each of the belts 232, 533-535 may be V-belts. The belt 232 extends between the drive pulley 531 and the pulley 534A, and the belt 534 extends between the drive pulley 531 and the pulley 535A. The belt 533 extends between the pulley 534A and the pulley 533A. The belt 534 extends between the pulley 535A and the pulley 536A. The pulley 531 includes two belt groves to accommodate the belt 232 and the belt 534. The pulley 534A includes two belt groves to accommodate the belt 232 and the belt 533, and the pulley 535A includes two belt groves to accommodate the belt 534 and the belt 535.

Figure 6:
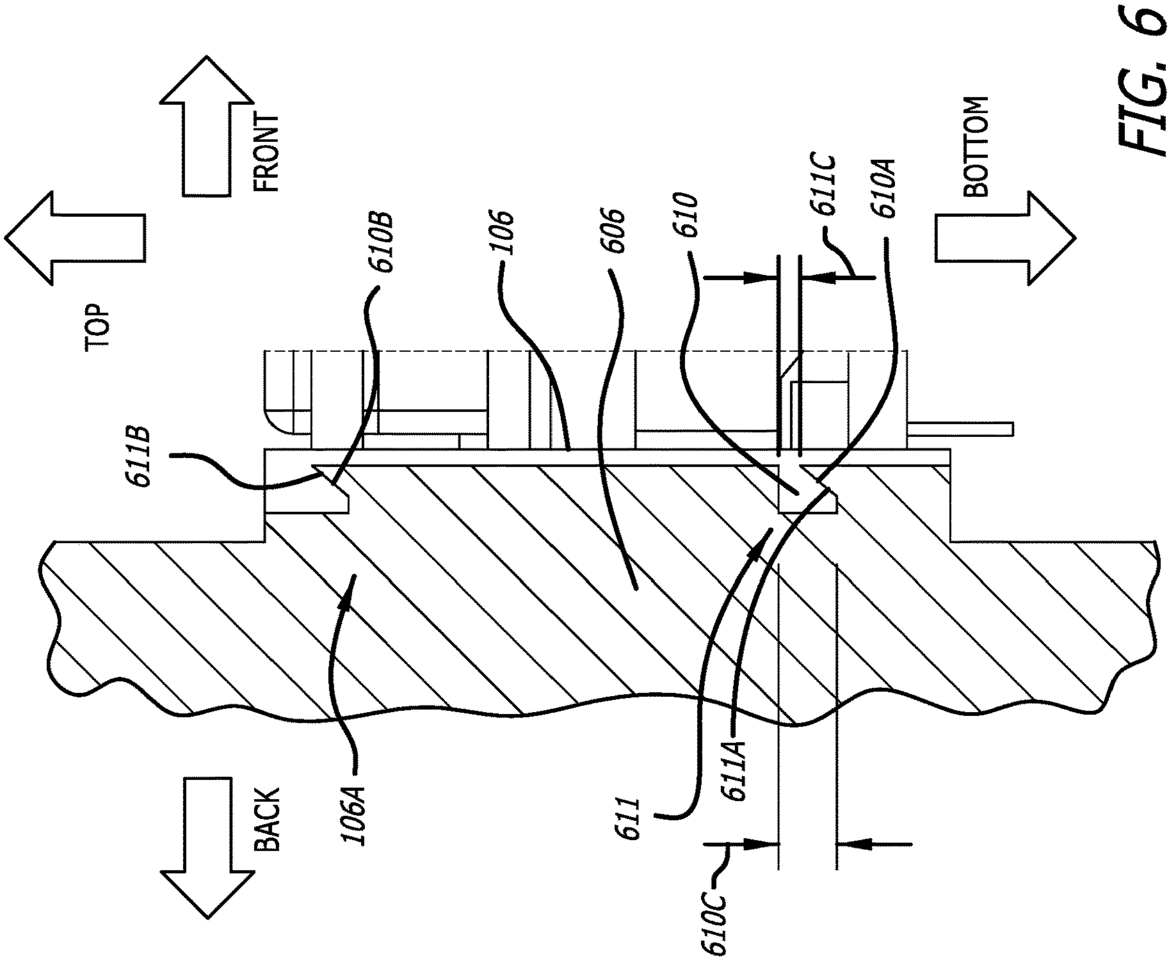
FIG. 6 is a detailed illustration of a mounting mechanism of the system of FIG. 1A, in accordance with some embodiments.

FIG. 6 is a detailed illustration of the mounting mechanism 106A of the apparatus 103. The mounting mechanism 106A is generally configured to define a secure attachment of the apparatus 103 to the wall or stand as discussed above. The mounting mechanism generally include the backing plate 106 and a corresponding mounting plate 606. FIG. 6 depicts the apparatus 103 mounted to the wall 606. The mounting plate 606 may be fixed to the wall 606 via any suitable attachment method, such as screwing, for example. In use, the mounting plate 606 may be first attached to the wall 606, and thereafter, the backing plate 106 may be attached to the mounting plate 606. In some embodiments, the mounting plate 606 may be sized and shaped so that the mounting plate 606 is hidden behind the apparatus 103 when backing plate 106 is attached to the mounting plate 606.

The mounting mechanism 106A includes corresponding engagement features of backing plate 106 and the mounting plate 606. In the illustrated embodiment, the backing plate 106 includes a rib 610 and the mounting plate 606 includes a corresponding groove 611 configured to receive the rib 610. The rib 610 and groove 611 are configured so that front-to-back separation of the backing plate 106 from mounting plate 606 is prevented when the rib 610 is disposed within the groove 611. The rib 610 includes an angled surface 610A and the groove 611 includes a corresponding angled surface 611A configured to define a front-to-back overlapping engagement with the angled surface 610A. In other words, the angled surface 611A of the mounting plate 606 is disposed in front of the angled surface 610A of the backing plate 106. The rib 610 also includes a width dimension 611C that is greater an opening slot dimension 611C of the groove 611. As such, the rib 610 is prevented from exiting the slot 611 via the slot opening. In use, the rib 610 is inserted within the groove 611 via a longitudinal sliding displacement (i.e., perpendicular to the page) of the rib 610 with respect to the groove 611. Similarly, the rib 610 is removed from the groove 611 via a longitudinal sliding displacement of the rib 610 with respect to the groove 611. As such, in use, the backing plate 106 is displaced right-to-left or left-to-right with respect to the mounting plate 606 to attach the backing plate 106 to the mounting plate 606 or remove the backing plate 106 from the mounting plate 606 when the mounting plate is attached to the wall 606.

In the illustrated embodiment, the backing plate 106 includes a second angled surface 610B and the mounting plate 606 includes a corresponding second angled surface 611B configured to define a front-to-back overlapping engagement with the second angled surface 610B. In other words, the second angled surface 611B of the mounting plate 606 is disposed in front of the second angled surface 610A of the backing plate 106. The second angled surfaces 610B, 611B are disposed toward to the top of the backing plate 106 and mounting plate 606, respectively. As such, the second angled surfaces 610B, 611B prevent a top portion of the mounting plate 606 from separating from a top portion of the mounting plate 606 in a front-to-back direction.

Figure 7:
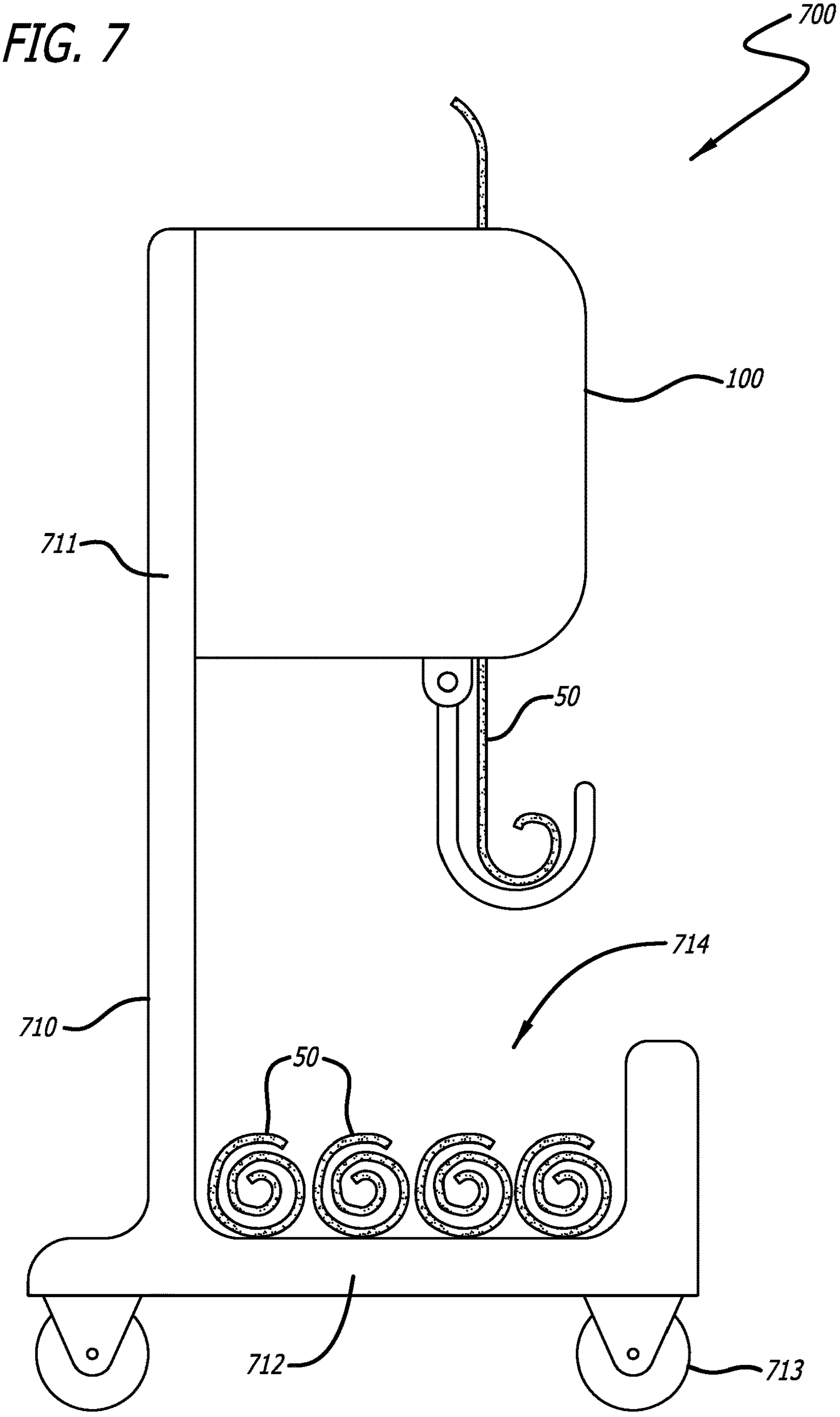
FIG. 7 illustrates an embodiment of a system for cleaning an exercise mat that includes a stand, in accordance with some embodiments.

FIG. 7 illustrates a left side view of an embodiment of the system further including the stand. The system 700 includes the system 100 attached to a stand 710. The stand 710 may include a pedestal 711 extending vertically upward away from a base 712. The base 712 may define a footprint of sufficient size and shape to prevent tipping of the system 700. In some embodiments, the stand 710 may include a number (e.g., 2, 3, 4 or more) of wheels 713 to enable positioning of the system 700 within a facility. In some embodiments, 2 or more of the wheels 713 may include castors. In some embodiments, the stand 710 may define a storage container 714 configured accommodate a plurality of mats 50.

While some particular embodiments have been disclosed herein, and while the particular embodiments have been disclosed in some detail, it is not the intention for the particular embodiments to limit the scope of the concepts provided herein. Additional adaptations and/or modifications can appear to those of ordinary skill in the art, and, in broader aspects, these adaptations and/or modifications are encompassed as well. Accordingly, departures may be made from the particular embodiments disclosed herein without departing from the scope of the concepts provided herein.

What is claimed is:

1. An apparatus for cleaning an exercise mat, comprising:

a number of roller pairs configured to transport the exercise mat through the apparatus from a top of the apparatus to a bottom of the apparatus, each roller pair comprising:

a first roller configured to frictionally engage a first side of the exercise mat so that rotation of the first roller displaces the exercise mat;

a second roller configured to passively engage an opposite second side of the exercise mat so that the second roller rotates in response to displacement of the exercise mat;

a first plurality of spray nozzles configured to apply a cleaning solution to the exercise mat as the exercise mat is transported through the apparatus, the first plurality of spray nozzles comprising:

a first subset of the first plurality of spray nozzles directed toward the first side;

a second subset of the first plurality of spray nozzles directed toward the second side;

a second plurality of spray nozzles configured to apply a rinsing solution to the exercise mat as the exercise mat is transported through the apparatus, the second plurality of spray nozzles comprising:

a first subset of the second plurality of spray nozzles directed toward the first side;

a second subset of the second plurality of spray nozzles directed toward the second side;

a first air knife configured to dry the first side; and a second air knife configured to dry the second side, wherein:

a first pair of rollers are configured to receive the exercise mat from a user at the top of the apparatus, a second pair of rollers are configured to receive the exercise mat from the first pair of rollers, the second pair of rollers positioned below the first pair of rollers, the first and second pluralities of spray nozzles are positioned between the first and second pairs of rollers, and the second plurality of spray nozzles are positioned below the first plurality of spray nozzles, wherein a pair of cleaning gutters is disposed beneath the first plurality of spray nozzles and above the second plurality of spray nozzles and configured to collect cleaning solution, wherein a pair of rinsing gutters is disposed beneath the second plurality of spray nozzles and configured to collect rinsing solution, wherein a first drying gutter is disposed beneath the first air knife and a second drying gutter is disposed beneath the second air knife, wherein each of the first drying gutter and the second drying gutter is configured to collect cleaning solution or rinsing solution that is blown off of the exercise mat by either of the first air knife or the second air knife, and wherein the first drying gutter and the second drying gutter are positioned above an ultraviolet (UV) light source.

2. The apparatus of claim 1, further comprising:

a pair of flexible lip members that define a fluid barrier between the first and second air knives and the UV light source.

3. The apparatus of claim 1, wherein:

a third pair of rollers are configured to receive the exercise mat from the second pair of rollers, and the first and second air knives are positioned between the second and third pairs of rollers.

4. The apparatus of claim 3, wherein the UV light source further comprises a first ultraviolet (UV) light source configured to disinfect the first side and a second UV light source configured to disinfect the second side.

5. The apparatus of claim 4, wherein:

a fourth pair of rollers are configured to (i) receive the exercise mat from a third pair of rollers and (ii) dispense the exercise mat from the apparatus, wherein the third pair of rollers are configured to receive the exercise mat from the second pair of rollers, and the first and second UV light sources are positioned between the third and fourth pairs of rollers.

6. The apparatus of claim 5, wherein rotation of the drive rollers of the first, second, third, and fourth roller pairs are synchronized such that transportation rates of the exercise mat through the first, second, third, and fourth roller pairs are equal.

7. The apparatus of claim 6, wherein the rollers of the first, second, third, and fourth roller pairs are rotationally coupled to a single motor.

8. The apparatus of claim 1, further comprising:

a mat rolling guide configured to form the exercise mat into a rolled shape subsequent to applying the rinsing solution.

9. A system for cleaning an exercise mat, comprising:

a cleaning subsystem, comprising:

a cleaning solution contained within a cleaning solution reservoir;

a plurality of cleaning spray nozzles configured to spray the cleaning solution onto both sides of the exercise mat; and a cleaning solution pump fluidly coupled between the cleaning solution reservoir and the plurality of cleaning spray nozzles, the cleaning solution pump configured to pump the cleaning solution from the cleaning solution reservoir to the cleaning spray nozzles;

a rinsing subsystem, comprising:

a rinsing solution contained within a rinsing solution reservoir;

a plurality of rinsing spray nozzles configured to spray the rinsing solution onto both sides of the exercise mat so as to remove the cleaning solution from the exercise mat; and a rinsing solution pump fluidly coupled between the rinsing solution reservoir and the plurality of rinsing spray nozzles, the rinsing solution pump configured to pump the rinsing solution from the rinsing solution reservoir to the rinsing spray nozzles;

a drying subsystem, comprising:

a pair of air knife nozzles directed toward both sides of the exercise mat;

an air pump fluidly coupled with the pair of air knife nozzles, the air pump configured to generate an air jet from each air knife nozzle to remove the rinsing solution from both sides of the exercise mat;

a disinfecting subsystem, comprising:

a pair of ultraviolet (UV) light sources configured to project UV onto both sides of the exercise mat to disinfect both sides of the exercise mat:

a transporting subsystem, comprising:

a plurality of roller pairs configured to sandwich the exercise mat between the two rollers of each roller pair;

a drive motor operatively coupled with a drive roller of each roller pair, the drive motor configured to rotate each drive roller to transport the exercise mat through the cleaning, rinsing, drying, and disinfecting subsystems; and a console coupled with the cleaning solution pump, the rinsing solution pump, the air pump, the UV light sources, and the drive motor, the console including a number of processors and a non-transitory computer-readable medium having stored thereon logic that, when executed by the one or more processors, causes operations of the system that include:

activating the drive motor to transport the exercise mat through the cleaning, rinsing, drying, and disinfecting subsystems;

activating the cleaning solution pump to apply the cleaning solution to the exercise mat;

activating the rinsing solution pump to remove the cleaning solution from the exercise mat;

activating the air pump to remove the rinsing solution from the exercise mat; and activating the UV light sources to disinfect the exercise mat, wherein a pair of cleaning gutters are disposed beneath the cleaning spray nozzles and above the plurality of rinsing spray nozzles and configured to collect cleaning solution, and wherein a pair of rinsing gutters are disposed beneath the plurality of rinsing spray nozzles and configured to collect rinsing solution, wherein a first drying gutter is disposed beneath the first air knife and a second drying gutter is disposed beneath the second air knife, wherein each of the first drying gutter and the second drying gutter is configured to collect cleaning solution or rinsing solution that is blown off of the exercise mat by either of the first air knife or the second air knife, and wherein the first drying gutter and the second drying gutter are positioned above the ultraviolet (UV) light sources.

10. The system of claim 9, further comprising a first mat sensor coupled with the console, the first mat sensor configured to detect when the user has inserted the exercise mat into an entrance of the system, the operations further including:

detecting the presence of the exercise mat within the entrance; and activating the drive motor in response to detecting the presence of the exercise mat within the entrance.

11. The system of claim 9, further comprising a second mat sensor coupled with the console, the second mat sensor configured to detect the presence of the exercise mat adjacent the cleaning spray nozzles, the operations further including:

detecting the presence of the exercise mat adjacent the cleaning spray nozzles; and activating the cleaning solution pump in response to detecting the presence of the adjacent the cleaning spray nozzles.

12. The system of claim 9, further comprising a third mat sensor coupled with the console, the third mat sensor configured to detect the presence of the exercise mat adjacent the rinsing spray nozzles, the operations further including:

detecting the presence of the exercise mat adjacent the rinsing spray nozzles; and activating the rinsing solution pump in response to detecting the presence of the exercise mat adjacent the rinsing spray nozzles.

13. The system of claim 9, further comprising a fourth mat sensor coupled with the console, the fourth mat sensor configured to detect the presence of the exercise mat adjacent the air knife nozzles, the operations further including:

detecting the presence of the exercise mat adjacent the air knife nozzles; and activating the air pump in response to detecting the presence of the exercise mat adjacent the air knife nozzles.

14. The system of claim 9, further comprising a fifth mat sensor coupled with the console, the fifth mat sensor configured to detect the presence of the exercise mat adjacent the UV light sources, the operations further including:

detecting the presence of the exercise mat adjacent the UV light sources; and activating the UV light sources in response to detecting the presence of the exercise mat adjacent the UV light sources.

15. The system of claim 9, further comprising:

a first volume sensor coupled with the console, the first volume sensor configured to determine a volume of the cleaning solution within a cleaning solution reservoir; and a second volume sensor coupled with the console, the second volume sensor configured to determine a volume of the rinsing solution within a rinsing solution reservoir, the operations further including:

obtaining a first determined volume from the first volume sensor;

obtaining a second determined volume from the second volume sensor;

comparing the first and second determined volumes with first and second volume limits, respectively, stored in the non-transitory computer-readable medium; and providing a notification when at least one of the first or second determined volumes is less than the first or second volume limits, respectively.

16. The system of claim 9, further comprising:

a third volume sensor coupled with the console, the third volume sensor configured to determine a volume of liquid waste collected within a liquid waste reservoir, the operations further including:

obtaining a third determined volume from the third volume sensor;

comparing the third determined volume with a third volume limit stored in the non-transitory computer-readable medium;

providing a notification when the third determined volume exceeds the third volume limit.

17. The system of claim 9, further comprising:

a mat rolling guide configured to form the exercise mat into a rolled shape subsequent to applying the rinsing solution.

18. A method for cleaning an exercise mat, comprising:

receiving the exercise mat within a cleaning apparatus;

applying a cleaning solution simultaneously to each of both sides of the exercise mat within the apparatus;

rinsing the cleaning solution simultaneously from each of both sides of the exercise mat within the apparatus; and drying the exercise mat within the apparatus, wherein the apparatus comprises:

a number of roller pairs configured to transport the exercise mat through the apparatus from a top of the apparatus to a bottom of the apparatus, each roller pair comprising:

a first roller configured to frictionally engage a first side of the exercise mat so that rotation of the first roller displaces the exercise mat;

a second roller configured to passively engage an opposite second side of the exercise mat so that the second roller rotates in response to displacement of the exercise mat;

a first plurality of spray nozzles configured to apply a cleaning solution to the exercise mat as the exercise mat is transported through the apparatus, the first plurality of spray nozzles comprising:

a first subset of the first plurality of spray nozzles directed toward the first side;

a second subset of the first plurality of spray nozzles directed toward the second side;

a second plurality of spray nozzles configured to apply a rinsing solution to the exercise mat as the exercise mat is transported through the apparatus, the second plurality of spray nozzles comprising:

a first subset of the second plurality of spray nozzles directed toward the first side;

a second subset of the second plurality of spray nozzles directed toward the second side;

a first air knife configured to dry the first side; and a second air knife configured to dry the second side, wherein:

a first pair of rollers are configured to receive the exercise mat from a user at the top of the apparatus, a second pair of rollers are configured to receive the exercise mat from the first pair of rollers, the second pair of rollers positioned below the first pair of rollers, the first and second pluralities of spray nozzles are positioned between the first and second pairs of rollers, and the second plurality of spray nozzles are positioned below the first plurality of spray nozzles, wherein a pair of cleaning gutters is disposed beneath the first plurality of spray nozzles and above the second plurality of spray nozzles and configured to collect cleaning solution, wherein a pair of rinsing gutters is disposed beneath the second plurality of spray nozzles and configured to collect rinsing solution, wherein a first drying gutter is disposed beneath the first air knife and a second drying gutter is disposed beneath the second air knife, wherein each of the first drying gutter and the second drying gutter is configured to collect cleaning solution or rinsing solution that is blown off of the exercise mat by either of the first air knife or the second air knife, and wherein the first drying gutter and the second drying gutter are positioned above an ultraviolet (UV) light source.

19. The method of claim 18, further comprising:

collecting liquid waste within a collection container within the apparatus.

20. The method of claim 18, further comprising:

disinfecting the exercise mat within the apparatus via UV light.

21. The method of claim 18, wherein receiving the exercise mat includes drawing the exercise mat into the apparatus via a transporting mechanism of the apparatus.

22. The method of claim 21, further comprising:

dispensing the exercise mat from the apparatus via the transporting mechanism.

* * * * *